Figure 1:
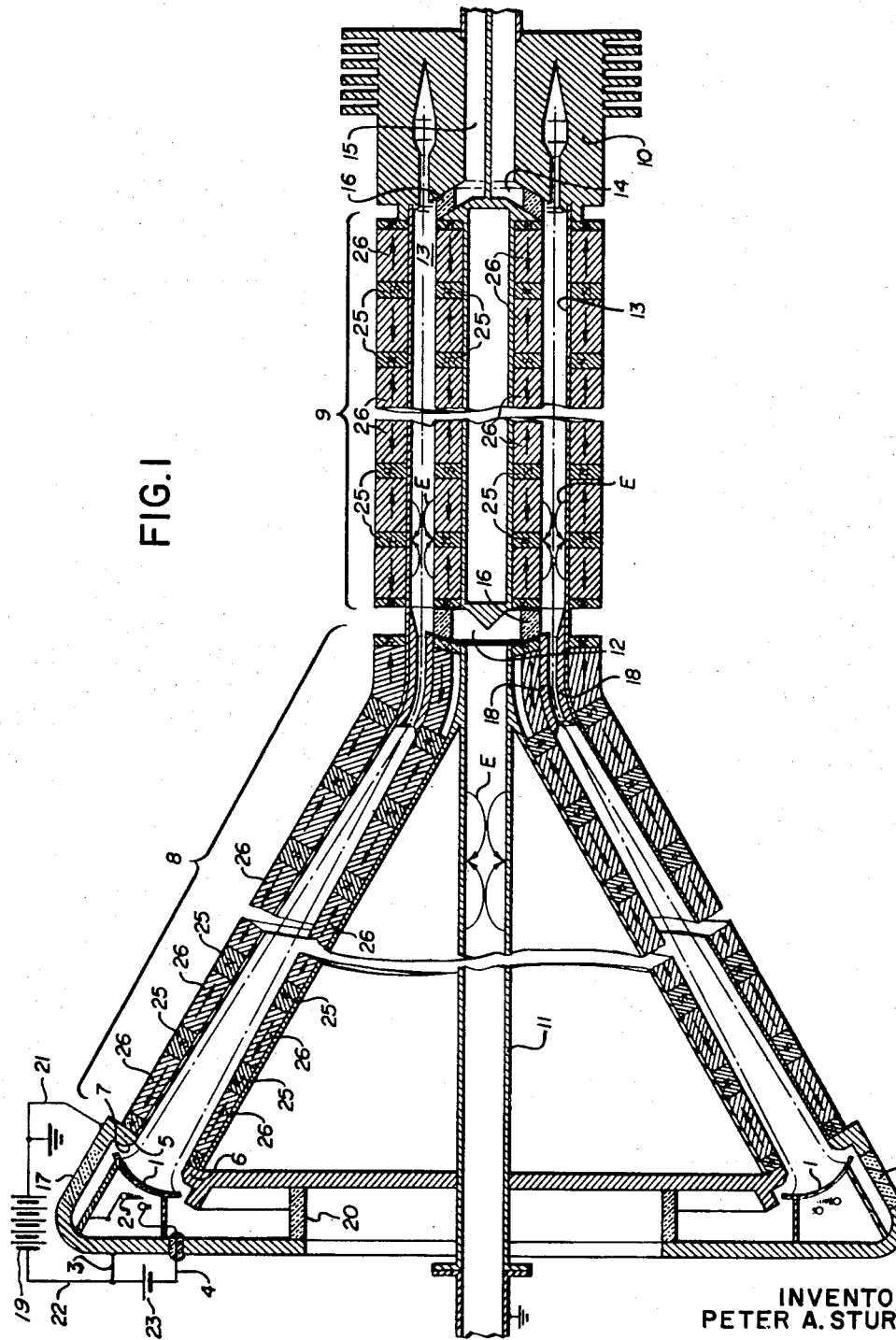

May 31, 1966 P. A. STURROCK 3,254,261
FAST WAVE TUBES USING PERIODIC FOCUSING FIELDS
Filed March 6, 1961 4 Sheets-Sheet 1

INVENTOR
PETER A. STURROCK
BY
ATTORNEY

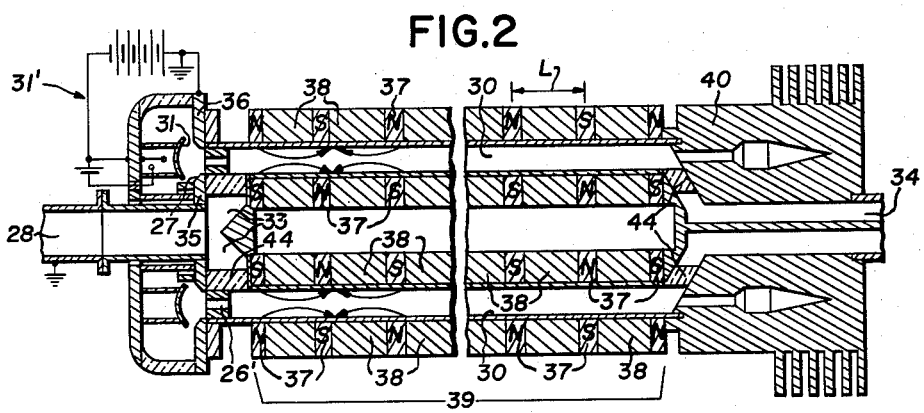
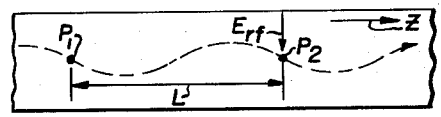
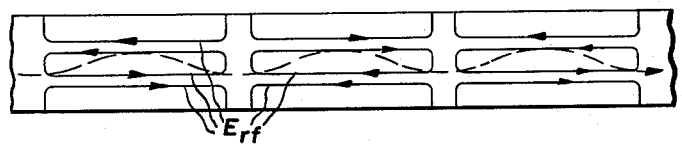
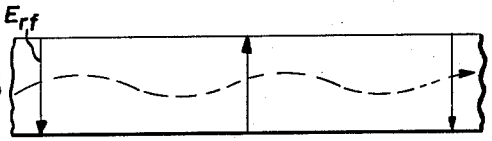
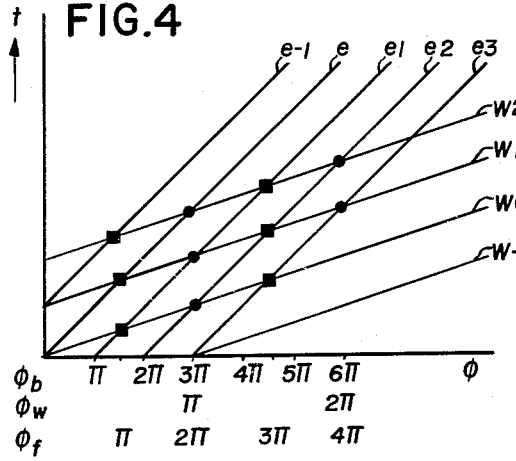
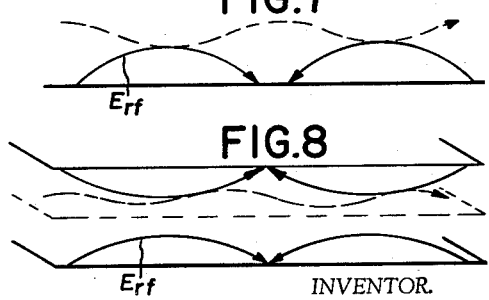
INVENTOR.
PETER A. STURROCK
BY
ATTORNEY

INVENTOR.
PETER A. STURROCK
BY
ATTORNEY

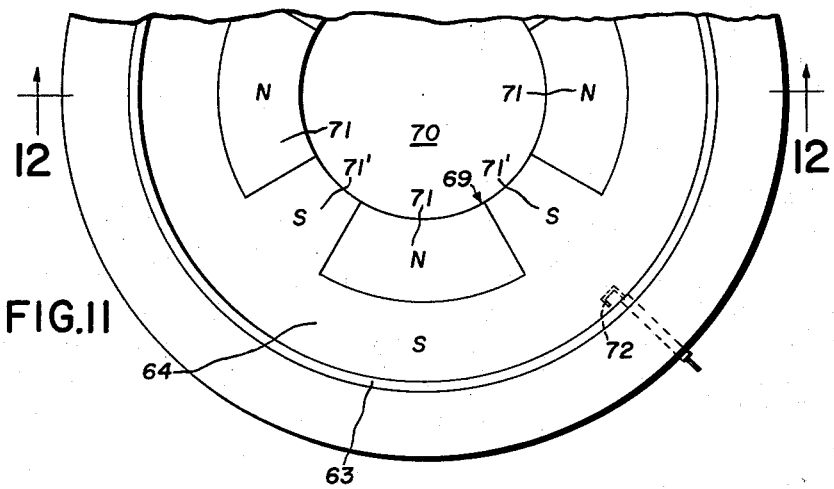
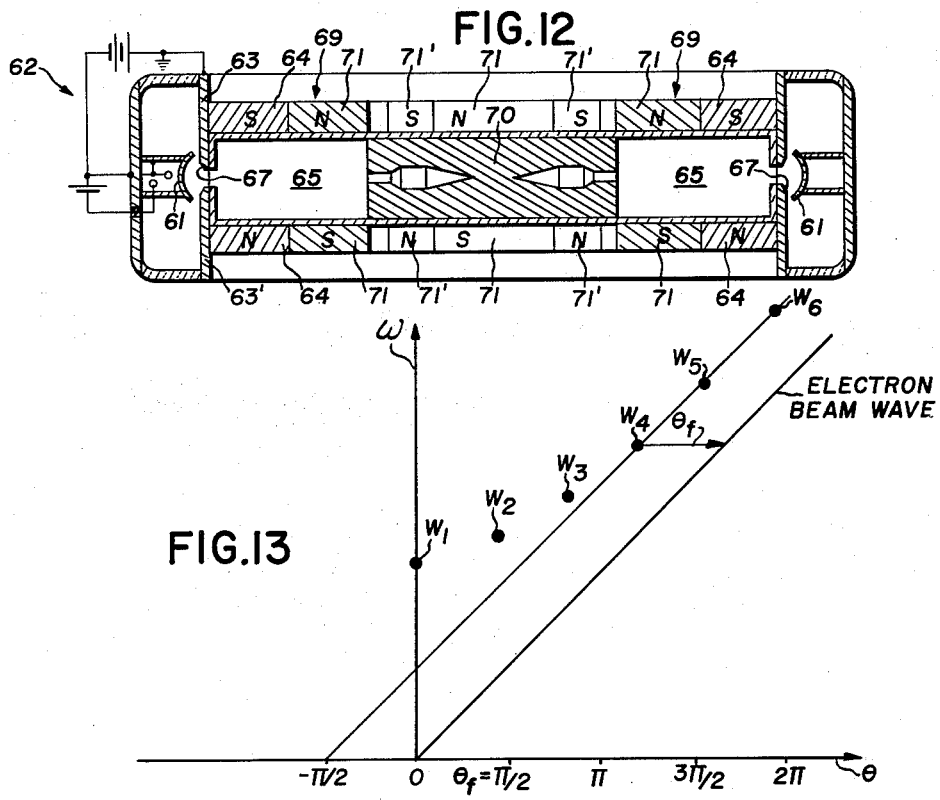

United States Patent Office 3,254,261
Patented May 31, 1966

3,254,261
FAST WAVE TUBES USING PERIODIC
FOCUSING FIELDS
Peter A. Sturrock, Los Altos, Calif., assignor to Varian Associates, Palo Alto, Calif., a corporation of California
Filed Mar. 6, 1961, Ser. No. 93,418
18 Claims. (Cl. 315—3.5)

The present invention, a continuation-in-part of the co-pending application of Peter A. Sturrock, S.N. 834,724, entitled, "Adiabatic Beam Condenser Method and Apparatus," filed August 19, 1959, now issued as U.S. Patent No. 3,102,211, on August 27, 1963, relates in general to microwave tubes capable of operating at useful power levels in the millimeter waveband and in particular to fast-wave tubes using periodic focusing fields.

Tubes now in present use at millimeter wavelengths operate on the traveling-wave tube principle, in the form of backward-wave oscillators and as forward-wave and backward-wave amplifiers. One disadvantage of conventional traveling-wave tubes is that cumulative interaction between an electron beam and an R.F. circuit field must be obtained by having the phase velocity of the circuit wave approximately equal to the beam velocity. Such a circuit wave is usually termed a "slow wave," since the phase velocity is less than the free-space velocity of light, whereas in the ordinary waveguide the phase velocity is equal to or greater than the velocity of light. This means that a special R.F. circuit must be employed to slow down the phase velocity of the wave. Such a slow-wave circuit may be obtained by means of a conducting helix or by periodic loading of a waveguide and such circuits are difficult to build at millimeter wavelengths. Other disadvantages of the conventional traveling-wave tube which employ slow-wave circuits are: (1) Since the R.F. field strength is greatest at the conducting surface there is a small interaction region since the field of the circuit decays rapidly (in the magnitude approximately as an exponential) away from the surface. (2) The periodicity of the loading is less than the free-space wavelength, therefore, it is not easy to match the slow-wave circuit to the input and output waveguides. (3) Further the decay of the R.F. field strength away from the conducting surface means a decreased beam coupling impedance unless the beam is compressed into an area extremely close to the metallic walls resulting in unwanted beam interception.

Tubes of the type we are proposing eliminate the objections presented above. This approach involves the interaction of a spatially periodic electron beam with a circuit wave that may have a phase velocity equal to or greater than the free-space velocity of light as well as less than the velocity of light. Such waves are termed fast waves. This means that the circuit may be, for example, an unloaded cylindrical or rectangular waveguide, a coaxial line, or parallel-plane conductors. Therefore, the tubes of the type we are proposing comprise two essential constitutents: (1) A wave propagating structure, which may be a simple waveguide propagating only waves whose phase velocity is faster than the velocity of light, or may be a slow-wave structure, which, however, will not be required to slow the phase velocity to the same extent as in conventional tubes, and (2) a periodic focusing field which induces electrons to move in spatially periodic trajectories.

It is, therefore, the object of this invention to provide an improved microwave tube.

The main feature of this invention is to produce a traveling-wave tube type electron tube having a periodic focusing structure extending along the beam path to produce spatially periodic trajectories in the electron beam whereby a spatial harmonic of the slow space-charge wave of the beam cumulatively interacts with a wave of an electromagnetic wave circuit.

Another feature of the present invention is to produce cumulative interaction between a spatially periodic electron beam trajectory and an electromagnetic wave, the phase velocity of which may be greater than, less than or equal to the velocity of light.

Another feature of the present invention is to provide cumulative interaction between a spatially periodic electron beam trajectory and an electromagnetic wave in a forward-wave amplifier, a backward-wave amplifier or a backward-wave oscillator.

Another feature of the present invention is to provide cumulative interaction between a spatially periodic electron beam trajectory and an electromagnetic wave in a magnetron.

Figure 10:
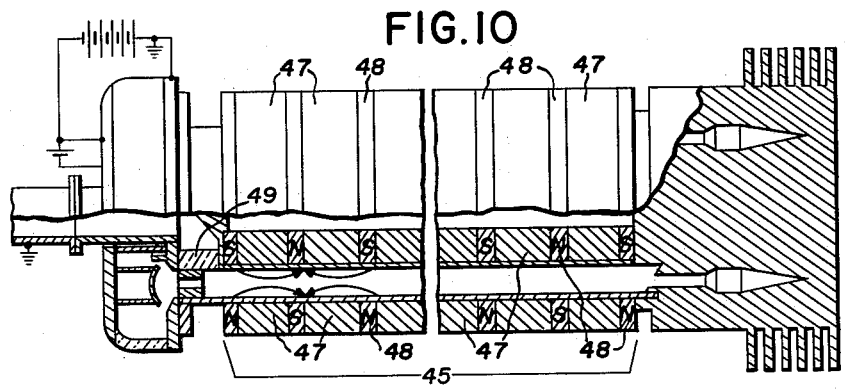
Figure 9:
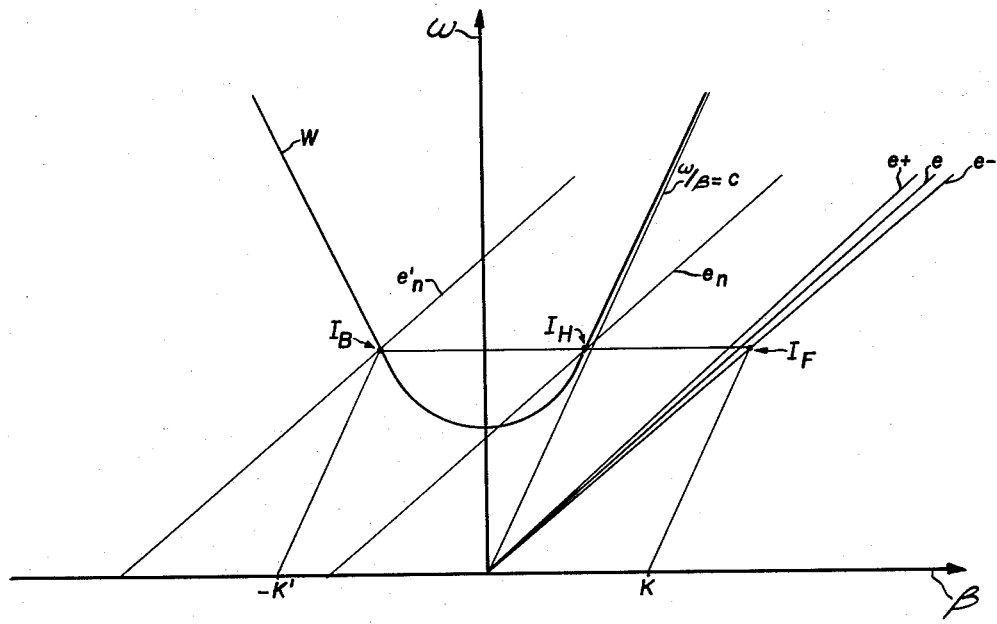

Other features and advantages of the present invention will become apparent upon a persual of the specification taken in connection with the accompanying drawings wherein:

FIG. 1 is a longitudinal cross-sectional view of a high frequency, fast wave electron tube apparatus employing the features of the present invention, FIG. 2 is a longitudinal cross-section view of a backward wave amplifier employing the features of the present invention, FIG. 3 is a schematic diagram showing an undulating electron beam passing through a waveguide, FIG. 4 is a diagram showing interaction between portions of an electromagnetic wave and portions of an electron beam, FIG. 5 is a longitudinal cross-section view in schematic form showing a TM wave and an undulating beam trajectory interacting in a rectangular waveguide, FIG. 6 is a longitudinal cross-sectional view in schematic form showing a TE wave and an undulating beam trajectory interacting in a rectangular waveguide, FIG. 7 shows in schematic form a TM wave supported by a dielectric or helix and its interaction with a beam trajectory, FIG. 8 shows in schematic form a sheet beam of spatically periodic electrons interacting with an R.F. electric field, FIG. 9 is an $\omega-\beta$ diagram to illustrate interaction between an electromagnetic wave and an electron beam in a traveling wave tube, FIG. 10 is a longitudinal cross-section view of a backward wave oscillator employing the features of the present invention, FIG. 11 is a partial top view of a magnetron employing the features of the present invention, FIG. 12 is a cross-sectional view taken at 12—12 in FIG. 11, and FIG. 13 is an $\omega-\theta$ diagram illustrating interaction between an electromagnetic wave and an electron beam in a magnetron.

Referring now to FIG. 1 there is shown a high frequency, high power velocity modulation tube incorporating the cumulative interaction between the spatially periodic beam and an electromagnetic wave of the present invention. More specifically, an annular cathode emitter button 1 is disposed at the wide end of the tube apparatus and is heated to an operating temperature via heater elements 2 disposed at the back side thereof and supplied with operating potentials via heater leads 3 and 4.

An anode is defined by two concentric annular rings 5 and 6 slightly spaced apart to define an annular gap, the gap being provided with a flared throat portion 7 for drawing the electrons from the cathode emitter 1 and forming them into a hollow conical beam. The conical beam emerging from the anode is picked up by a periodic magnetically focused beam condenser 8. Within the condenser 8 the beam is condensed in thickness as well as in circumference to provide a beam having greatly increased current density at the output end of the beam condenser 8 as described in detail in the parent application. The beam leaving the condenser 8 is matched to a coaxial periodic magnetic deflection beam focusing structure 9 surrounding the beam-field interaction spaces of the tube for maintaining the size and shape of the beam therein. After passing through the periodic magnetic deflection beam focusing apparatus 9, the beam is collected by annular beam collector 10.

Wave energy, which it is desired to amplify, is fed into the input section of the tube via cylindrical waveguide 11 operating in a suitable TM mode, as shown. The input wave energy then passes through a radial waveguide transducer 12 which transforms the wave energy into a TM mode propagating through the coaxial waveguide section 13 forming the beam-field interaction spaces of the tube apparatus. In coaxial waveguide section 13 the longitudinal electric fields of the TM mode interact with the electron beam to produce amplification of the wave energy by cumulative interaction between the running electromagnetic waves in the coaxial waveguide section 13 and the undulating electrons of the beam. The amplified wave energy is then extracted via radial waveguide transducer section 14 and fed via coaxial line 15 to a suitable load, not shown.

Two annular wave permeable window members 16 as of, for example, alumina ceramic are vacuum sealed at their ends transversely of the radial waveguide transducer sections 12 and 14 respectively to maintain the vacuum integrity of the vacuum envelope and to support the inner coaxial portion of the magnetic beam deflection focusing structure 9.

Waveguide height restricting members 18 are disposed in the waveguide 13 to reduce the section of coaxial waveguide defined therebetween to a cutoff condition for the desired TM mode such that the injected wave energy will not propagate back up the conical waveguide defined by the coaxial beam condenser section 8.

Suitable operating potentials are applied to the anode members 5 and 6 with respect to the cathode emitter 1 via power supply 19 and leads 21, 22 and 3, respectively. Suitable operating potential and current is supplied to the heater 2 from heater power supply 23 via leads 3 and 4 respectively. The high cathode to anode D.C. potential is held off via annular insulators 17 and 20 respectively, sealed at their ends in a vacuum tight manner to the tube envelope. Power supply 19 preferably has the positive end thereof grounded such that the tube body may be operated at ground potential thereby minimizing the risk to operating personnel.

The operation of the adiabatic beam condenser structure 8 is fully described, set forth and claimed in the parent application and is only referred to in the present application.

The particular periodic magnetic deflection focusing utilized in the structure of FIG. 1 is described in greater detail in my co-pending application, Serial No. 793,495, entitled, "Magnetic Beam Focusing Method and Apparatus," now issued as U.S. Patent No. 3,013,173, granted on December 12, 1961. Briefly, this method of focusing is carried out by coaxially disposed alternating consecutive pairs of magnetic pole pieces 25 and magnets 26 as shown in FIG. 1. This focusing structure directs a periodic magnetic focusing field transversely to the beam path, the sign of the transverse periodic field alternating longitudinally of the beam. In this manner, as the charged particles pass through the alternating transverse portion of the magnetic field they are caused to be alternately transversely deflected in the plane of the beam. This deflection causes the particles to have a certain periodic alternating velocity transverse to the direction of the beam. This transverse velocity of the particles coacting with the longitudinal fringing fields between the successive transverse field portions produces the inwardly directed focusing force on the particles confining them against transverse motion outwardly of the beam.

The principle of operation of the device is that the periodically varying position and periodically varying velocity of electrons of the beam gives rise to a beam interaction between the spatially periodic beam trajectory and the electromagnetic wave, the consequence of which is that it is possible to obtain cumulative interaction, that is, an increase in electromagnetic wave energy at the expense of the kinetic energy of the beam, when the mean velocity of the electrons is different from the phase velocity of the electromagnetic wave. In particular, it is possible to obtain such cumulative interaction when the phase velocity of the electromagnetic wave is substantially higher than the mean velocity of the electrons, even exceeding the velocity of light.

An appropriate $\omega-\beta$ diagram is shown in FIG. 9 to illustrate the interaction relationship between the electron beam $e$ and the electromagnetic wave W where $\omega$=frequency in radians/sec., $\beta$=spatial-frequency in radians/meter. The electromagnetic wave shown has a velocity greater than the velocity of light. The electron beam shown has two space-charge waves which travel at velocities close to that of the electron beam $e$ which is less than the velocity of light. These two waves, $e+$ and $e-$ are the reuslt of the plasma oscillations caused by space-charge of the electrons in the beam $e$. Traveling wave interaction occurs between the slow space-change wave $e-$ and the electromagnetic wave. As is readily seen from the $\omega-\beta$ diagram, there is no interaction between the fundamental electron beam $e-$ and the electromagnetic wave W because they are not in synchronism. However, it is possible, under proper conditions, to obtain a cumulative interaction between a harmonic, $e_n'$ of the beam wave and the electromagnetic wave, where $n$ indicates the $n$th harmonic of the space-charge wave $e-$.

Although there are a variety of ways to achieve synchronism between an electron beam and a TE mode in a rectangular waveguide, we shall consider the undulating beam shown in FIG. 3 for interaction with the dominant electromagnetic field that varies as $e^{j\omega t} e^{-j\beta z}$; the condition for synchronism can be deduced from considering two successive position, P1 and P2 of an electron P having a mean D.C. longitudinal electron velocity, $V_b$; then $(\omega t - \beta Z) - 2n\pi$ where $n$ is an integer, for $$t = \frac{L}{V_b}$$

and $Z=L$; where $V_b$ is average Z— directed electron velocity, L is equal to one period of the electron beam due to the focusing structure (not shown), $\omega$ is radian per second, and $\beta$ is spatial-frequency radian per meter. This is the mathematical representation of the statement that the electromagnetic field has returned to the same phase with respect to an electron when the electron has gone a distance equal to the periodic distance of the focusing structure. For the undulating beam, the beam current may be considered to be composed of slow and fast space harmonics, and for interaction in an arbitrary model the synchronism equation is $$\frac{1}{\lambda_b} = \pm \frac{1}{\lambda_w} + \frac{n}{\lambda_f}$$

where $\lambda_b$=wavelength of the space charge slow wave, $\lambda_w$=wavelength of the electromagnetic wave within the wavelength, $n$=an integer corresponding to the $n$th space harmonic in the beam and $\lambda_f$=wavelength of the focusing structure. By interacting with a higher space harmonic the periodicity may be increased, and there is an attendant decrease in harmonic amplitude. The (+) or (—) sign depends on whether a backward or forward wave is involved.

Looking at the above equation for synchronism and at the $\omega$–$\beta$ diagram of FIG. 9, it is possible to see the relationship between $\lambda_f$, the wavelength of the focusing structure, and the distance between the point of interaction $I_H$ and the space-charge slow wave $e-$. This distance is $\lambda_f$.

Referring to FIG. 4 there is a propagation diagram (time vs. $\phi$, where $\phi$ is distance along the beam and wave path) illustrating interaction between portions of the electromagnetic wave and portions of the electron beam passing through the electromagnetic wave. The velocity of the electromagnetic wave as shown is approximately equal to three times the velocity of the electron beam passing through the electromagnetic wave. In order to simplify the explanation let us follow the wave portion $W_o$ as it travels along, in for example, a wave guide. We will begin at $t=0$, $\phi_w=0$ where $\phi_w$ is the phase of the electromagnetic wave, and assume this is a region of energy exchange from the slow space-charge wave of the electron beam $e$, to wave portion $W_o$, as it will be if the phase of the slow space-charge wave $\phi_b$ is there zero. As the wave portion $W_o$ progresses along, its next point of interaction with the beam is with slow space-charge wave $e_1$. In this region of interaction, depicted by a square, the phase of $W_o$ has not changed but the phase of $e_1$ is $\pi$, so that this is a region of energy exchange from the wave portion $W_o$ to the slow space-charge $e_1$. As the electromagnetic wave portion $W_o$ progresses, another region of interaction occurs, this time with slow space-charge wave of the electron beam $e_2$, and as indicated by the dot, this is an exchange of energy from the slow space-charge wave $e_2$ to the wave portion $W_o$. If now the periodicity of the beam focusing structure has the symmetry characterized by $\phi_f$, such that the interaction at $\phi_f=0$, $2\pi$, $4\pi$ . . . is enhanced and interaction of $\phi_f=\pi$, $3\pi$, $5\pi$ . . . is inhibited, there is an accumulation of energy exchange between the wave portions $W_o$, $W_1$, $W_n$ and electron beam portions $E_1$, $E_2$, $E_n$ . . . as the electromagnetic wave passes through the electron beam in the waveguide, which results in amplification of the electromagnetic wave. The reason there is little exchange of energy from the electromagnetic wave to the electron beam as compared to the exchange of energy from the electron beam to the electromagnetic wave is that the periodicity of the focusing structure is such as to provide for synchronism between the electromagnetic wave and the *slow* space-charge wave, not with the *fast* space-charge wave.

Referring now to FIG. 2 there is shown a backward-wave-amplifier employing the features of the present invention. This structure is similar to that shown in FIG. 1 except no beam condenser is shown as it is not a part of the present invention. More specifically, an annular cathode emitter button 31 is disposed at one end of the tube apparatus and is heated to operating temperature in the same manner as shown in FIG. 1. Suitable operating potentials are applied to the anode members 35 and 36 by a power supply generally shown at 31' in the same manner as in FIG. 1.

The anode is defined by two concentric annular rings 35 and 36 slightly spaced apart to define an annular gap, the gap being provided with a flared throat portion 27 for drawing the electrons from the cathode emitter 31 and forming them into a hollow beam. The beam emerging from the anode enters a coaxial, fast wave supporting and periodic magnetic deflection beam focusing structure 39. After passing through the periodic magnetic deflection beam focusing structure 39, the beam is collected by annular beam collector 40.

Periodic focusing of the electron beam is effected by alternating consecutive pairs of magnetic pole pieces 37 and magnets 38 which form a magnetic deflection beam focusing structure 39 and are spaced along the outer and inner surfaces of coaxial waveguide 30. The particular periodic magnetic deflection focusing utilized along the coaxial waveguide 30 is described in FIG. 1 and my aforementioned U.S. Patent No. 3,013,173.

Wave energy it is desired to amplify is fed into the input section of the tube via waveguide 34 operating in a suitable mode. The input wave energy then passes up through radial waveguide transducer 33 into coaxial waveguide 30 where the wave (here a backward wave) and the electron beam interact. The interaction is similar to that described in the operation of FIG. 1 except a different condition of synchronism is used due to the backward-wave. The amplified wave energy is then extracted via radial waveguide transducer 33 and fed via waveguide 28 to a suitable load.

As in the structure of FIG. 1, wave permeable window members 44 are provided to maintain vacuum integrity of the envelope. Waveguide height restricting members are provided at 26' to prevent wave energy from being propagated into the cathode-anode region of the structure.

The principle of operation of the backward-wave-amplifier is much like that of a forward-wave-amplifier shown in FIG. 1. In order to show how interaction occurs, let us return again to the $\omega$–$\beta$ diagram of FIG. 9. In order to obtain backward-wave interaction, a harmonic $e_n'$ of the space-charge wave $e$ interacts with the wave in the $-\beta$ portion of the $\omega$–$\beta$ diagram. The vector between $I_B$ and $I_F$, now determines the distance between members of the focusing structure in order to assure that the proper harmonic, $e_n'$ interacts with the wave W.

It is noted that the scheme which we are proposing is suitable for interaction with a variety of field configurations, such as shown in schematic form in FIGS. 5–8. FIG. 5 shows a periodic beam trajectory interacting with a TM mode in a rectangular waveguide. FIG. 6 shows a periodic beam trajectory interacting with a TE mode in a rectangular waveguide. With proper conditions of synchronism it is possible to obtain a cumulative interaction as described above. FIG. 7 represents the case of a surface wave supported by a dielectric or helix where the field strength decreases as the distance from the surface increases. It is possible here to obtain cumulative interaction as before with the proper conditions of synchronism. FIG. 8 shows a TM wave with a sheet-beam having a spatially periodic trajectory in one plane. This scheme is suitable for use with any periodic focusing such as one using electric deflection, magnetic deflection, electrostatic lenses, magnetic lenses, or combinations of these.

FIG. 10 shows a backward-wave oscillator 45 similar to the backward-wave amplifier of FIG. 2, however only one output terminal 49 is provided in accordance with backward-wave oscillator principle.

Periodic focusing of the electron beam is effected by alternating consecutive pairs of magnetic pole pieces 48 and magnets 47 in the same manner as in the backward-wave amplifier of FIG. 2.

The principle of operation of the backward-wave oscillator is effected by increasing the beam current high enough to obtain a gain of unity or greater. Interaction occurs between a harmonic of the space-charge wave $e_n'$ and the circuit wave in the $-\beta$ portion of the $\omega$–$\beta$ diagram as in backward-wave amplifier operation.

Referring now to FIGS. 11 and 12 there is shown a magnetron employing the features of the present invention. A circular cathode emitter 61 is disposed at the outer portion of the tube apparatus and is heated to an operating temperature via heater elements, supplied with operating potentials generally shown at 62. An anode is defined by two rings 63 and 63' slightly spaced apart to define an annular gap, the gap being provided with a flared throat portion 67 for drawing the electrons from the cathode emitter 61 and forming them into a disk shaped stream. The stream of electrons emerging from the anode is diverted by means of the magnetic field region 64 so as to enter almost tangentially into the periodic magnetic deflection stream focusing structure 69 for maintaining the disk shaped stream of electrons therein. After passing through the periodic magnetic deflection beam focusing structure 69, the disk shaped stream of electrons is collected by circular electron collector 70.

A magnetic field is provided by magnetic poles 71 and 71′ to control the path of the electrons as they make their way to the collector 70. The magnetic configuration consists of a pair of spaced-apart ring-like magnetic pole pieces positioned inside of the anode. Ring-like magnetic pole pieces 64 have a plurality of wedge like portions 71′ extending inward. These wedge like portions 71′ are magnetic pole pieces of the same polarity as ring-like members 64. Adjacent to pole piece members 64 and 71′ are wedge like pole pieces 71, of opposite polarity from members 64 and 71′. Pole pieces 71′ describe a smaller arc than do pole pieces 71. The reason being subsequently explained. The magnetic sections on the lower half of the beam focusing structure 61 are of opposite polarity from the respective magnetic section in the upper portion and it may in general be necessary to provide a return yoke connecting the upper and lower magnetic poles.

An output loop 72 is provided as one means of extracting energy from the magnetron. It is noted that any desirable output means may be utilized and the entire device is sealed in order to maintain vacuum integrity.

Electrons which are emitted from the cathode 61, enter into the beam-field interaction space 65. Upon entry, the electrons immediately enter a magnetic field which deflects the electrons transversely to the beam path. Before the deflection causes the electrons to circle back to the cathode, a substantial fraction of the electrons enter a magnetic field of opposite polarity which will cause the electrons to deflect in the opposite direction, in this instance toward the collector. The electrons pass through a series of alternating magnetic fields which cause the electrons to deflect in the plane of the stream. This deflection causes the particles to have a certain periodic alternating angular velocity transverse to the general direction of the stream of electrons. The purpose of the unequal arcs of the magnetic pole pieces 70 and 71′ is to cause the beam to deflect more in an inward trajectory and therefore generally move in almost circular orbits until the electrons reach the collector.

The principle of operation of the present device is best illustrated in the appropriate $\omega$–$\theta$ diagram 13. Interaction is achieved between the electron beam wave and W, one of the circuit waves, illustrated by a series of points, $W_1$, $W_2$ . . . . These points represent resonant frequencies of electromagnetic waves in the torus-shaped cavity. The periodicity of the electron beam wave is determined by spacing of the focusing members, which in the present example is $\theta_f = \pi/2$. In the example depicted this focusing periodicity results in coupling with wave numbered $W_4$ with the electron beam wave $e_n$, at $-\pi/2$ as shown in the $\omega$–$\theta$ diagram in FIG. 13.

It is noted that the resulting periodicity in the electron beam wave is due to the spacing of magnetic pole pieces 71 and 71′. In our example, the periodicity is $\pi/2$ which may be seen from FIG. 11 as the distance between pairs of alternating focusing pole pieces.

What has been shown is a number of microwave structures capable of operating at useful power levels in the millimeter waveband.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency charged particle discharge apparatus, means for forming a source of charged particles, means for forming and projecting said charged particles over a predetermined beam path, said beam of charged particles having a charge density great enough to produce substantially separated fast and slow space charge waves, means disposed along said beam path to periodically perturb particle trajectories of said beam to product a spatial harmonic of said slow space-charge wave of said beam, means at the terminal end of said beam path for collecting said particles, means disposed along said beam path for propagating an electromagnetic wave in energy exchanging relationship to said beam, said wave propagating means being dimensioned and arranged to support a wave with a phase velocity such that the wave will cumulatively interact with the spatial harmonic of said slow space-charge wave of said beam of charged particles within said path to produce a net transfer of energy between said spatial harmonics of said beam of charged particles and said electromagnetic wave energy on said electromagnetic propagating means.

2. The apparatus according to claim 1 wherein said means disposed along said beam path to periodically perturb the particle trajectories of said beam includes a plurality of spaced displaced pole-pairs of opposite polarity transverse to the path of said beam of charged particles.

3. The apparatus according to claim 1 wherein said means disposed along said beam path to periodically perturb the particle trajectories of said beam includes a plurality of spaced displaced magnetic members having alternating polarities, the spacing of said magnetic members being such that the periodically perturbed trajectories of said beam produce space-charge spatial harmonics synchronized with the electromagnetic wave to produce a cumulative exchange of energy from the beam to said electromagnetic wave.

4. The apparatus according to claim 3 wherein the synchronism between the charged particles and the electromagnetic energy is determined by the expression $$\frac{1}{\lambda_b} = \pm \frac{1}{\lambda_w} + \frac{n}{\lambda_f}$$

where $\lambda_b$=wavelength of the beam space-charge slow wave, $\lambda_w$=wavelength of the electromagnetic wave within the waveguide, $\lambda_f$=the wavelength of the focusing structure, and $n$=an integer corresponding to the $n$th space harmonic of the beam.

5. In a high frequency charged particle discharge apparatus, a path for electromagnetic wave energy therein, wave energy output terminal means, means to project an electron stream in electrical association with said electromagnetic wave energy, means for collecting said electrons, said electron stream having a charge density great enough to produce substantially separated fast and slow space-charge waves, means disposed along said path to produce successive space-displaced undulations along the electron stream path to produce a certain beam wave spatial harmonic with a phase velocity in synchronism with a wave traveling on the wave path whereby said electrical association between said undulating electron stream and said electromagnetic wave is an interacting cumulative energy exchanging relation.

6. The apparatus according to claim 5 wherein said electromagnetic wave energy has a phase velocity greater than the velocity of said electron beam.

7. The apparatus according to claim 5 wherein said electromagnetic wave energy has a phase velocity greater than the velocity of light.

8. The apparatus according to claim 5 whereby the spacing of said undulations is such that the periodicity of the periodically perturbed electron beam is in synchronism with the electromagnetic wave energy, said synchronism being determined by the expression $$\frac{1}{\lambda_b} = \pm \frac{1}{\lambda_w} + \frac{n}{\lambda_f}$$

where $\lambda_b$=the wavelength of the beam space charge slow wave, $\lambda_w$=wavelength of the electromagnetic wave within the waveguide, $\lambda_f$=wavelength of the focusing structure and $n$=an integer corresponding to the $n$th space harmonic of the space charge slow wave.

9. The apparatus according to claim 5 wherein said means to undulate the electron stream path includes a plurality of spaced apart permanent magnetic members of alternating polarities which periodically perturb the electron stream such that it will pursue a spatially periodic trajectory.

10. In a high frequency charged particle discharge apparatus, a curvilinear path for electromagnetic wave energy therein, wave energy output terminal means, means to project a disk-like electron stream in electrical association with said wave energy, means for collecting said electron stream, said collector being concentric with said curvilinear path and said means to project electrons, means disposed along said curvilinear path to cause said disk-like electron stream to pursue an undulating, descending, concentrical, curvilinear path to said collecting means, such that said electrical association results in a cumulative energy exchange between said undulating electron stream and the fields of said electromagnetic wave energy.

11. The apparatus according to claim 10 wherein said means disposed along said curvilinear path includes a plurality of spaced magnetic poles, successive poles along said path being of opposite polarities.

12. The apparatus according to claim 10 wherein said means disposed along said curvilinear path includes a plurality of spaced magnetic poles, transversely positioned along said path being of opposite polarity.

13. The method of effecting cumulative interaction between a beam of charged particles and an electromagnetic wave including the steps of; forming a source of charged particles into a predetermined path, said charged particles having a charge density great enough to produce substantially separated slow and fast wave space-charge waves within the beam propagating electromagnetic wave energy through said path, periodically perturbing said charged particles in spatially periodic trajectories having a periodicity to produce a space harmonic of said slow wave space-charge wave, and cumulatively interacting said space harmonic with electromagnetic wave energy on a circuit thereby producing a net transfer of energy from said charged particles to said electromagnetic wave.

14. The method according to claim 13 whereby the periodicity of said periodically perturbed charged particles is such that the space harmonic of said slow space-charge wave is in synchronism with the phase velocity of said electromagnetic wave.

15. The method of claim 14 wherein said synchronism is determined by the expression $$\frac{1}{\lambda_b} = \pm \frac{1}{\lambda_w} + \frac{n}{\lambda_f}$$

where $\lambda_b$=wavelength of the beam space-charge slow wave, $\lambda_w$=wavelength of the electromagnetic wave within the waveguide, $\lambda_f$=the wavelength of the focusing structure and $n$=an integer corresponding to the $n$th space harmonic of the beam.

16. The method according to claim 14 whereby said electromagnetic wave energy has a velocity greater than the velocity of the charged particles.

17. The method according to claim 14 whereby said cumulative interaction results in amplification of said electromagnetic wave.

18. A high frequency tube apparatus including, means for forming and projecting a beam of electrons over an elongated beam path, said beam of electrons having a charge density great enough to produce substantially separated fast and slow space charge beam waves, said beam of electrons having a hollow tubular form, means forming a periodic array of pairs of concentric alternating polarity magnetic poles arranged successively downstream along the beam path with concentric pole pairs of opposite sign being mutually opposed on the inside and outside of said tubular beam to produce transverse undulating electron trajectories in the stream of the tubular beam, such undulations of the electrons thereby producing a spatial harmonic of the slow space charge beam wave of the beam, means forming a coaxial wave supporting structure coaxially aligned with said tubular beam and having a hollow annulus radially and axially coextensive with said tubular beam, said coaxial wave structure being adapted and arranged to support a certain TM mode therein for wave energy propagating thereon, means for exciting the certain TM mode in said coaxial wave supporting structure to produce a cumulative interaction between the TM mode of the wave energy and the spatial harmonic beam wave of the slow space charge wave of the beam of electrons to produce a net transfer of energy between the spatial harmonic of said beam of electrons and the TM mode wave on said coaxial wave supporting structure, and means for extracting wave energy from said coaxial wave structure for propagation to a suitable load.

References Cited by the Examiner

UNITED STATES PATENTS

| | | | |
|---|---|---|---|
| 2,661,441 | 12/1953 | Mueller | 315—3.6 |
| 2,808,532 | 10/1957 | Field | 315—3.5 |
| 2,828,439 | 3/1958 | Fletcher | 315—3.5 |
| 2,925,520 | 2/1960 | Cutler et al. | 315—3.6 |
| 3,020,440 | 2/1962 | Chang | 315—3.5 |

GEORGE N. WESTBY, *Primary Examiner.*

ARTHUR GAUSS, *Examiner.*